No. 758,380. PATENTED APR. 26, 1904.
J. W. PAGE.
EXCAVATING SHOVEL.
APPLICATION FILED DEC. 17, 1903.
NO MODEL.
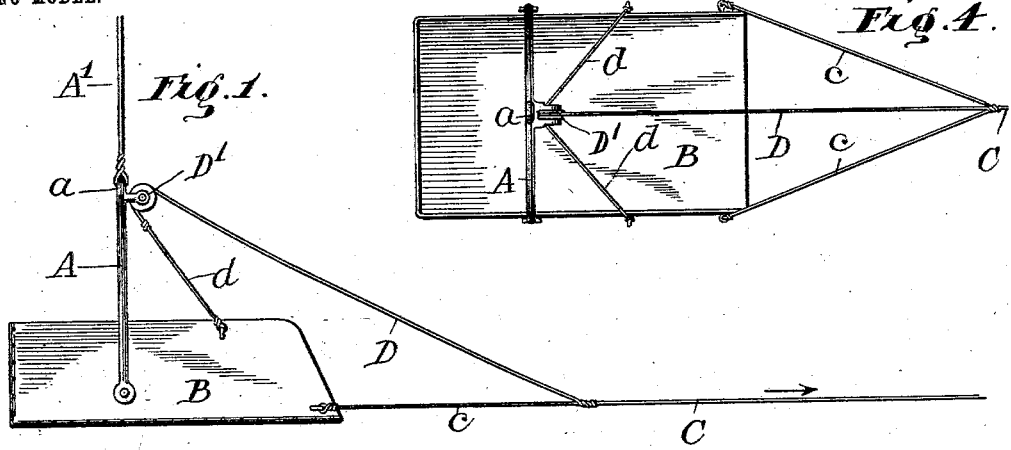
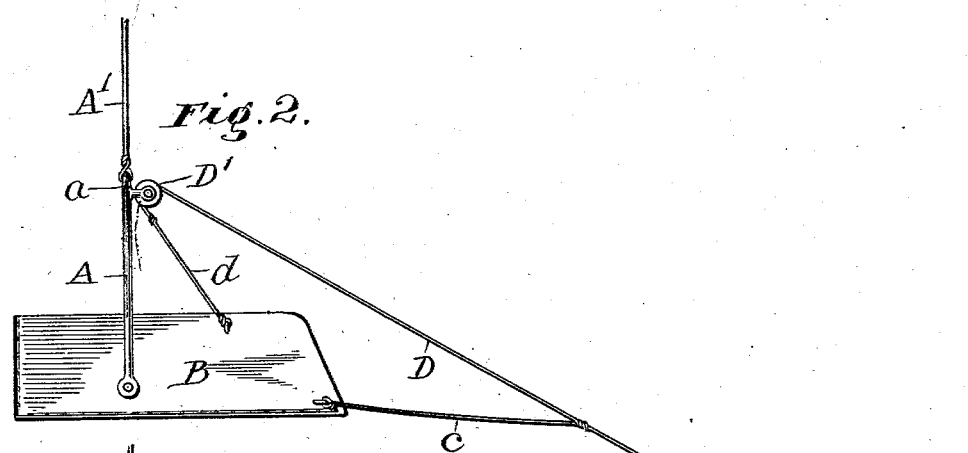
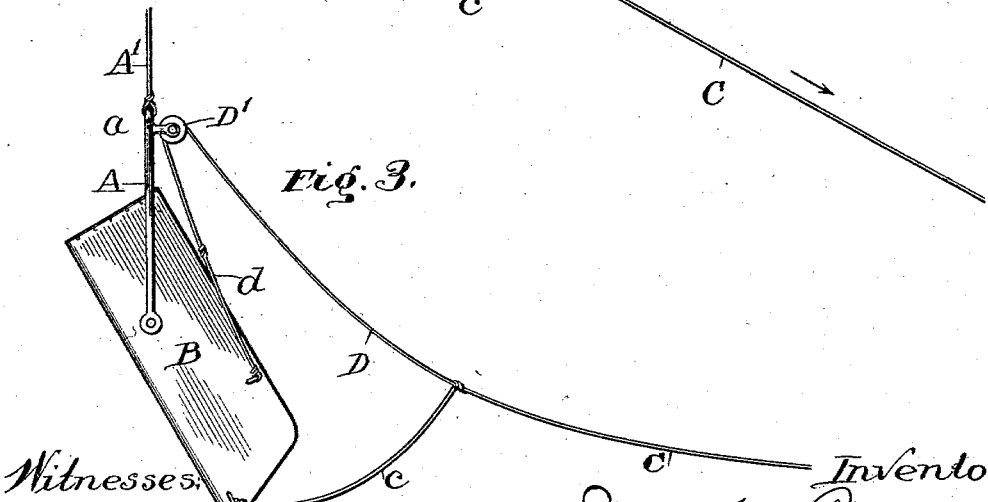
Witnesses:
Chas. O. Shervey
Russell Wiles
Inventor:
John W. Page,
by H. S. Bitner
Atty.

No. 758,380. Patented April 26, 1904.

UNITED STATES PATENT OFFICE.

JOHN W. PAGE, OF CHICAGO, ILLINOIS.

EXCAVATING-SHOVEL.

SPECIFICATION forming part of Letters Patent No. 758,380, dated April 26, 1904.

Application filed December 17, 1903. Serial No. 185,494. (No model.)

*To all whom it may concern:*

Be it known that I, JOHN W. PAGE, a citizen of the United States of America, residing at Chicago, in the county of Cook and State of Illinois, have invented certain new and useful Improvements in Excavating-Shovels, of which the following is a specification.

My invention relates to certain new and useful improvements in excavating-shovels; and its object is to produce a device of this class which shall have certain advantages which will appear fully and at large in the course of this specification.

To this end my invention consists in certain novel features of construction, which are clearly illustrated in the accompanying drawings and described in the specification.

In the aforesaid drawings, Figure 1 is a side view of my improved shovel, showing it in the position which it ordinarily occupies when in the act of excavating. Fig. 2 is a similar view showing the shovel in the position which it occupies in transit from the place of excavation to the place where the dumping is done. Fig. 3 is a similar view of the shovel in the act of dumping its load, and Fig. 4 is a plan of the shovel in the position shown in Fig. 1.

Referring to the drawings, A indicates a suitable supporting-bail, which is provided at its upper end with an eye $a$ for the attachment of a rope or cable A', by which the shovel can be lifted. This bail, it will be noted, has two arms, which straddle the shovel B, the ends of the arms being pivoted to the shovel at a point slightly behind the center thereof, so that if the shovel is permitted to hang free it will swing down to an almost vertial position, as illustrated in Fig. 3. To the lower front corners of the shovel are attached two hauling-ropes $c$, which are joined a short distance in front of the shovel and secured to a main hauling-rope C. From the point of attachment of the short hauling-ropes $c$ to the main hauling-rope C there also extends a holding-rope D, which runs over a pulley D', attached to the bail A, and to the end of this holding-rope D are attached two short holding-ropes $d$, which are secured to the upper edge of the shovel at a point somewhat in front of the bail A.

The operation of this device will be readily apparent. When excavating earth or other material, the shovel is moved horizontally by the main hauling-rope C, which runs over a suitable windlass or other power device. This, of course, puts a strain both on the short hauling-ropes and on the holding-ropes—that is, it tightens up the entire rope structure between the shovel and the point of attachment of the other ropes to the main hauling-rope C. This holds the shovel horizontal, and it can be pulled in a horizontal direction into any mass of material and will thus fill itself. After the shovel has been filled it is in practice raised by the rope A', which is attached to the upper end of the bail A, the main hauling-rope C being kept tight meanwhile, and the shovel eventually reaches a position similar to that indicated in Fig. 2. When the ropes reach this position, it will be seen that the shovel is still supported in a horizontal position; but in this case it is supported by means of strain transmitted by the main hauling-rope over the pulley and through the holding-ropes $d$. It will be seen, therefore, that whatever position the shovel may be in it will be held horizontal as long as the main hauling-rope C is kept taut, the force for holding the shovel horizontal passing to it at times through the short hauling-ropes and at other times through the holding-rope; but no position will ordinarily be reached where the shovel will tend to tilt downward if the ropes are merely kept tight. When the shovel has been transported in any desired way to the place where it is to be dumped, all that is necessary to do is to loosen the main hauling-rope. This will permit the shovel to swing into the position indicated in Fig. 3, where it will of course dump itself.

The shovel may be used in connection with the ordinary derrick, the rope A' running over a pulley in the derrick, or the shovel may be used equally as well with a suspended cable, the rope A' running over a pulley traveling upon the cable, as is the usual practice in performing such work as is done with a shovel of this device.

I claim as new and desire to secure by Letters Patent—

1. In a device of the class described, the combination with a suitable shovel, of a supporting member for the same pivoted thereto behind the center of gravity thereof; a rope adapted to exert an upward pull on said shovel, a rope adapted to exert a substantial horizontal pull on said shovel, and means for maintaining continuous tension upon one or the other of said ropes.

2. In a device of the class described, the combination with a suitable shovel, of a supporting member therefor pivoted thereto at a point behind the center of gravity thereof, a pulley attached to said supporting member above said shovel, a holding-rope running over said pulley and secured to said shovel, a hauling-rope also secured to said shovel, and a main hauling-rope connected to the ends of said first-named ropes.

3. In a device of the class described, the combination with a suitable shovel, of a bail pivoted to the shovel behind the center of gravity thereof, a main hauling-rope having two branches, one of said branches being attached directly to the shovel and the other running over a suitable pulley above the shovel and being also attached thereto.

In witness whereof I have signed the above application for Letters Patent, at Chicago, in the county of Cook and State of Illinois, this 9th day of December, A. D. 1903.

JOHN W. PAGE.

Witnesses:
CHAS. O. SHERVEY,
RUSSELL WILES.